United States Patent [19]

Okada

[11] Patent Number: 4,675,967

[45] Date of Patent: Jun. 30, 1987

[54] APPARATUS FOR HANDLING LARGE FASTENERS OF A PRESSURE VESSEL

[75] Inventor: Kenji Okada, Kure, Japan

[73] Assignee: Babcock-Hitachi Kabushiki Kaisha, Tokyo, Japan

[21] Appl. No.: 748,026

[22] Filed: Jun. 24, 1985

[30] Foreign Application Priority Data

Jun. 23, 1984 [JP] Japan ............................ 59-128417
Feb. 9, 1985 [JP] Japan ............................ 60-22804

[51] Int. Cl.$^4$ ............................................ B23P 19/06
[52] U.S. Cl. ................................................ 29/240
[58] Field of Search .................. 29/240, 240.5, 456, 29/526 R, 564.1; 173/164; 81/53

[56] References Cited

U.S. PATENT DOCUMENTS 2,855,661 10/1958 Forster ............................ 29/240.5
4,084,460 4/1978 Garofalo ......................... 29/240

FOREIGN PATENT DOCUMENTS 1102786  3/1961  Fed. Rep. of Germany ........ 29/240
2442798  3/1976  Fed. Rep. of Germany ........ 29/240
2709592  9/1978  Fed. Rep. of Germany ........ 29/240
2815361 10/1979  Fed. Rep. of Germany ........ 29/240
 204606 11/1982  Japan .

Primary Examiner—William R. Briggs
Attorney, Agent, or Firm—Antonelli, Terry & Wands

[57] ABSTRACT

An apparatus for removing and remounting large nuts which are associated with bolts provided in a pressure vessel assembly under a remote control, with the apparatus comprising a station being movable in a circumferential and radial direction, a lifting arm for driving a frame vertically close to and apart from the station, a motor mounted on the frame, a nut driving unit provided with pawls, each of which is engageable with a radial groove formed on an end surface of the large nut, a nut lifting chuck provided at a distal end portion of the nut driving unit, and a transmission for transmitting a driving force from the motor to the nut driving unit through the pawls.

5 Claims, 15 Drawing Figures

APPARATUS FOR HANDLING LARGE FASTENERS OF A PRESSURE VESSEL

BACKGROUND OF THE INVENTION

The present invention relates to an apparatus for mounting and demounting a large nut and, more particularly, to an apparatus for removing and/or remounting (referred to as "handling", hereinafter) a large fastener, such as, for example, a nut onto a stud bolt, both of which are used for a pressure vessel such as a nuclear reactor.

In, for example, Japanese Patent Application No. 204606/1982, a nut handling operation is automatically carried out by a machine, with the purpose of the nut handling operation being for reducing an exposure of the operator to contaminants; however, a disadvantage of this proposed construction resides in the fact that, another machine is required for transporting nuts and washers to the desired positions.

Accordingly, it is an object of the present invention to provide an apparatus for handling fasteners such as, for example, nuts employed on a nuclear reactor pressure vessel under remote control without any need for access by an operator to the high radiation level area, and which is capable of transporting the removed nut to a desired position and a nut to be mounted to a predetermined position on the pressure vessel.

Another object of the present invention resides in providing an apparatus capable of automatically handling a nut together with an associated washer while simultaneously accomplishing the first-described object.

Yet another object of the present invention resides in providing an apparatus which is capable of reducing the magnitude of impact applied in a nut handling operation, while simultaneously accomplishing the first-described object.

In accordance with the present invention, an apparatus for removing and remounting large fastener means such as nuts comprises a circumferentially and radially movable station, a vertically movable frame close to and spaced from the station through a lifting means, a motor mounted on the frame, and a nut driving means provided with pawls, each of which is engageable with a radial groove formed on an end surface of the large nut, and provided at a distal end portion thereof with a nut retaining means. A transmission means transmits a driving force from the motor to the nut driving means to remove and remount the large nuts through the pawls.

The above and other objects, features, and advantages of the present invention will become more apparent from the following description when taken in connection with the accompanying drawings.

DETAILED DESCRIPTION

Figure 1:
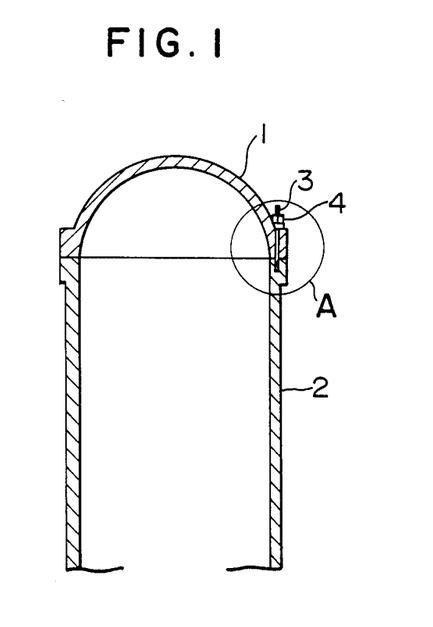
FIG. 1 is a fragmentary schematic sectional view of a nuclear reactor pressure vessel.

Referring now to the drawings wherein like reference numerals are used throughout the various views to designate like parts and, more particularly, to FIG. 1, according to this figure a reactor pressure vessel includes a closure head 1 and a body 2, with the closure head 1 and the body 2 be tightly clamped together by stud bolts 3, nuts 4 and washers 5.

Figure 2:
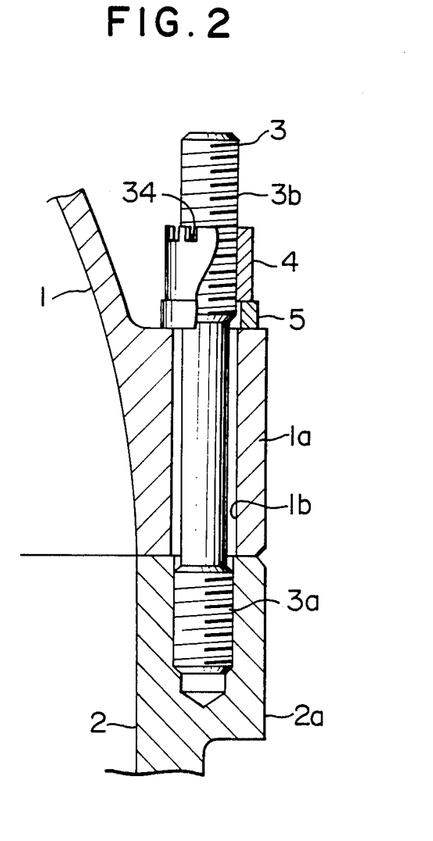
FIG. 2 is an enlarged fragmentary sectional view of a portion A of the reactor pressure vessel shown in FIG. 1.

As shown in FIG. 2, engagement is obtained between the closure head 1 and the body 2 through the stud bolt 3, with the stud bolt 3 being connected at one end thereof to the body 2 by the engagement between a thread portion 3a of the stud bolt 3 and a complementary thread portion of a flange 2a of the body 2. The other end portion of the stud bolt 3, provided with a thread portion 3b, projects from a through-hole 1b formed in a flange 1a of the closure head 1. The nut 4 is threaded onto the thread portion 3b of the stud bolt 3 to tightly clamp the closure head 1 and the body 2 through the washer 5. In general, a plurality of stud bolts 3 are disposed circumferentially on the flange 2a of the body 2 in such a manner that the adjacent nuts 4 are almost contact each other. Accordingly, not only the washer 5 but the nut 4 has a cylindrical shape since the ordinary polygonal nut which is turned by the force applying to the side portions thereof is not used therefor. More specifically, each of the nuts 4 has radial grooves 34 formed at the upper end surface thereof. It is necessary to open and close the closure head 1 of the reactor pressure vessel for the fuel change during periodic inspection and, to open and close the closure head 1, it is necessary to remove and remount all the nuts 4 and washers 5 onto the respective stud bolts 3.

In this case, at first, the exposed thread portion 3b of the bolt 3 has rust or corrosion thereon removed and cleaned, and then the nut 4 is removed.

Previously, the operation of handling the nuts 4 and the washers 5 has been conducted by an operator under the unfavorable conditions directly touching contaminants in a high radiation level area.

Further, since the stud bolts 3 are disposed in close proximity to each other as described above, the nut handling operation requires the operator to work in an inconveniently narrow space, which disadvantageously reduces the working efficiency.

Figure 3:
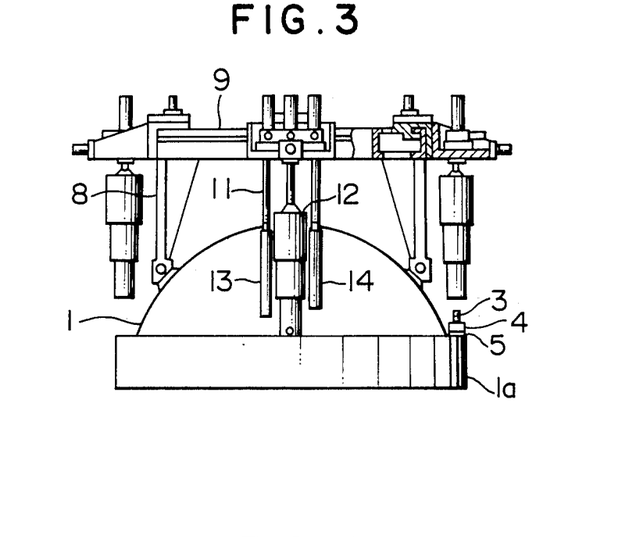
FIGS. 3 and 4 are a front elevational view and a plan view, respectively, of the equipment on which the large fastener handling apparatus of the invention is mounted.
Figure 4:
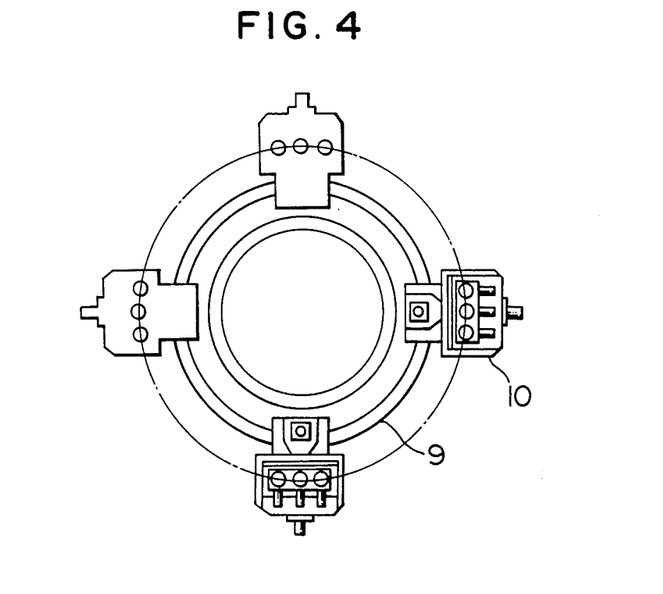

In accordance with the present invention, as shown in FIGS. 3 and 4, a stationary annular track 9 is mounted onto the closure head 1 of the reactor pressure vessel through a trestle 8, with stations 10 being provided on the track 9, which stations 10 are automatically movable by remote control so as to be circumferentially as well as radially displaced. Each of the stations 10 has a bolt cleaner 13, a stud tensioner 12 and a nut handling apparatus 14 all of which are suspended from the station 10 through the respective lifting arms 11.

Figure 5:
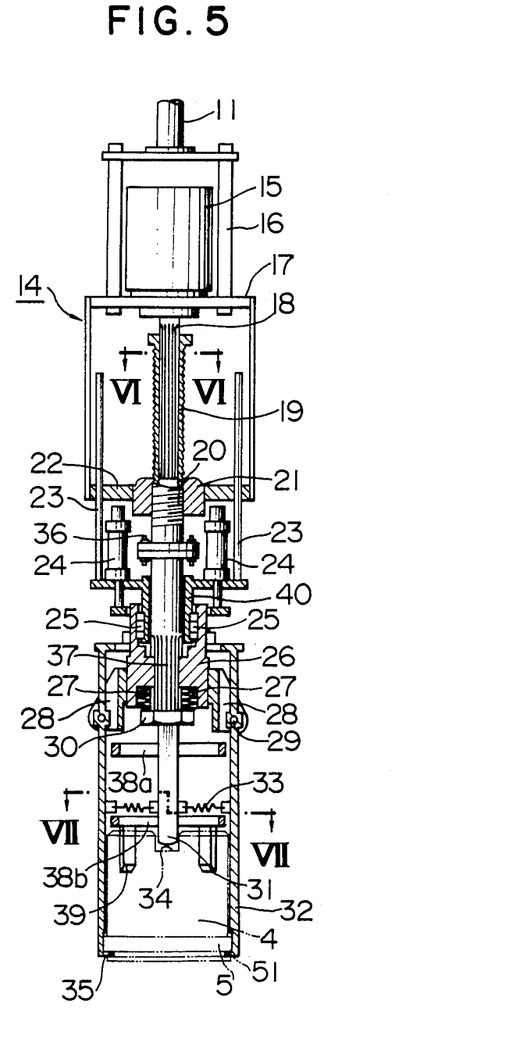
FIGS. 5, 8 and 9 are partly-sectional views of the large fastener handling apparatus of the invention in various states, respectively.

A nut handling apparatus 14 of the present invention, as shown in FIG. 5, includes motor 15 for driving a nut 4, with the motor 15 being installed on the upper surface of a mounting frame 17 connected to the lower end of the lifting arm 11 through rods 16. The driving force from the motor 15 is transmitted to a nut driving unit 26 through a transmission telescopic shaft assembly including a rotary shaft 18 secured to an output shaft of the motor 15 and an axially movable driven shaft 19.

Figure 6:
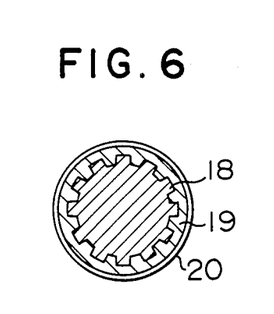
FIG. 6 is a sectional view taken along the line VI—VI in FIG. 5.
Figure 7:
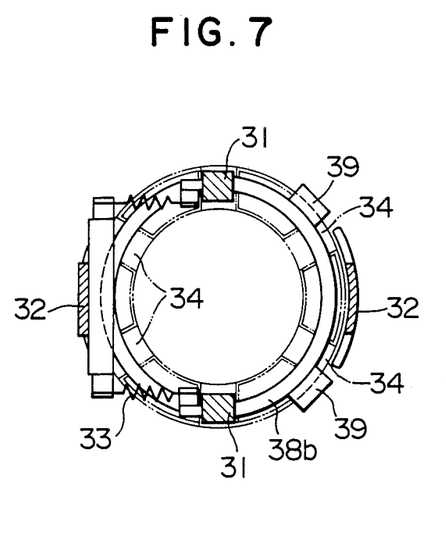
FIG. 7 is a sectional view taken along the line VII—VII in FIG. 5.

As shown in FIG. 6, the outer periphery of the rotary shaft 18 and the inner surface of the upper portion of the driven shaft 19 are splined to cooperate with each other to rotate simultaneously. This spline structure makes it possible to absorb any axial movement of the turning nut 4 without any axial movement of the motor 15. Further, the driven shaft 19 is formed on the outer periphery of its upper portion with a thread 20 which has a pitch slightly larger than the thread pitch of the nut 4. The driven shaft 19 is further splined on the outer periphery 37 of its lower portion and is provided on the outer periphery of its lowermost end portion with a thread for a spring retaining nut 30. The driven shaft 19 shown in FIG. 5 includes two parts which are firmly connected together by a bolt-nut unit 36 for the sake of convenience in manufacturing. It is, however, also possible to employ a one piece driven shaft. The driven shaft 19 is retained through the thread 20 thereof by a shaft retaining nut 21 which is fixed on a rigid plate 22 of the mounting frame 17.

The nut driving unit 26 is provided on an inner periphery thereof with a spline which is engageable with the splined periphery 37 of the driven shaft 19. The nut driving unit 26 is fitted to the driven shaft 19 through the spline. The nut driving unit 26 is retained through a retaining spring 27 by the spring retaining nut 30 which is screwed onto the lowermost end portion of the driven shaft 19. Moreover, the nut driving unit 26 is provided with chuck supports 28 and nut driving pawls 31. The nut driving pawls 31 are supported by support ring 38a and 38b. The lower support ring 38b is provided with guide elements 39. The guide elements 39 are spaced circumferentially from each other for aligning the axis of the nut 4 with the axis of rotation of the nut driving unit 26 so that the driving force from the motor 15 is smoothly transmitted to the nut 4. A chuck 32 is pivotally supported by the chuck support 28 through a pivot pin 29, with the chuck 32 lifting the nut 4 and the washer 5. The chuck 32 is opened and closed by the action of air cylinders 24 and springs 33. Each of the springs 33 has one end thereof secured to the associated nut driving pawl 31 and the other end secured to the chuck 32. Thus, the chuck 32 is constantly biased radial inwardly by the force of the springs 33. The air cylinders 24 are installed on an air cylinder retainer 40 which is carried by the nut driving unit 26 through a bearing 25. The air cylinder retainer 40 is axially movable along the driven shaft 19 together with the nut driving unit 26. However, the air cylinder retainer 40 is prevented from rotating together with the nut driving unit 26 since rods 23 which are secured to the air cylinder retainer 40 extend upwardly through the respective bores which are formed in the rigid plate 22.

Figure 8:
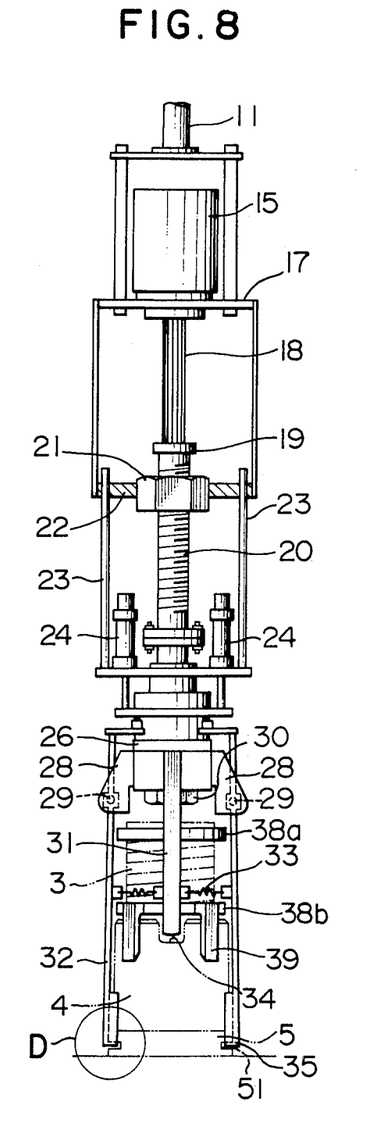

In removing the nut, each of the stations 10 are moved along the track 9 to the predetermined positions in which the nut handling apparatus 14 reaches above the nut 4 to be removed, as shown in FIG. 3. Then, the handling apparatus 14 is lowered by the lifting arms 11 until the nut driving pawls 31 are received by the respective radial grooves 34 formed on the nut 4. At this time, not only the nut driving unit 26, but the associated members such as the nut driving pawls 31, the chuck 32, the air cylinders 34 and so forth are lowered together with the driven shaft 19, as shown in FIG. 8, to the lower end portion of the rotary shaft 18. These members are retained by the shaft retaining nut 21. Further, in this state, the upper end of the chuck 32 is pressed by the air cylinders 24. Accordingly the lower portions of the chuck 32 are apart from each other radial outwardly against the biasing force of the springs 33.

Figure 9:
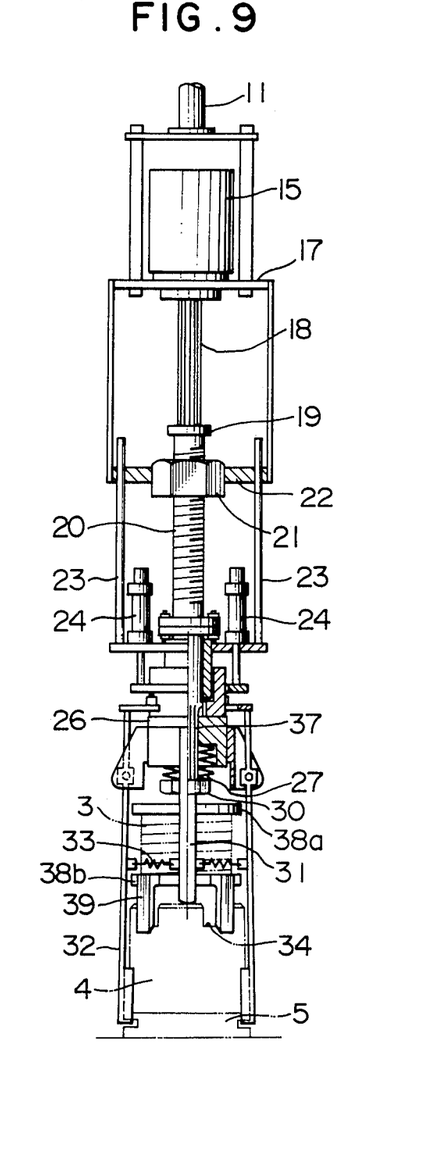

On the other hand, since the nut 4 has only several radial grooves 34 spaced circumferentially to each other, it is not always possible for the nut driving pawls 31 to be respectively received by the radial grooves 34 when the apparatus 14 is lowered. The nut driving pawls 31 may undesirably be placed on the upper end surface of the nut 4, as shown in FIG. 9. Even in such a case, the lifting arm 11 is lowered to the predetermined position where the nut driving pawls 31 would otherwise be respectively received by the radial grooves 34 of the nut 4. Consequently, the nut driving unit 26 to which the nut driving pawls 31 are mounted is moved upwardly relative to the driven shaft 19 while sliding on the spline periphery 37 formed on the driven shaft 19. When the motor 15 is actuated in this state, the nut driving pawls 31 slide on the upper end surface of the nut 4 in a direction of rotation of the motor 15. When the nut driving pawls 31 reach above the respective radial grooves 34 of the nut 4, the pawls 31 are moved downwardly by the gravitational weights of the nut driving unit 26 and the members associated therewith and then are automatically received by the radial grooves 34. At this time, the impact caused by rapid downward movements of the nut driving unit 26 and the associated members, is absorbed by the retaining spring 27 disposed between the nut driving unit 26 and the spring retaining nut 30. When the nut driving pawls 31 are slid on the upper end surface of the nut 4, the guide elements 39 move along the outer periphery of the nut 4. Accordingly, it is possible for the nut driving unit 26 to smoothly rotate without any offset between axes of the unit 26 and the nut 4.

Figure 10:
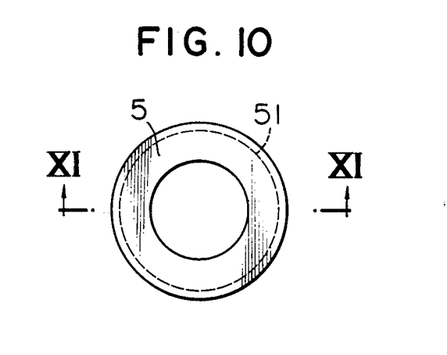
FIG. 10 is a plan view of a washer.
Figure 11:
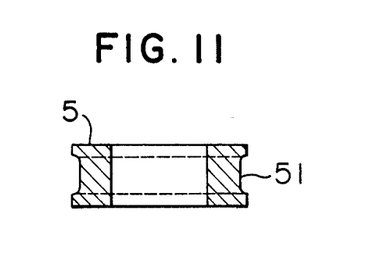
FIG. 11 is a sectional view taken along the line XI—XI in FIG. 10.

When the nut driving pawls 31 have been respectively received by the radial grooves 34, the air cylinders 24 are released to relieve the pressing force applied to the upper end of the chuck. Consequently, lifting pawls 35, provided at the distal end of the chuck 32, are engaged with a circumferential groove 51, formed on the washer 5, the details of which are shown in FIGS. 10 and 11. In the case where two washers 5 are used together for one set of a nut and a stud bolt, a lower washer is provided with a groove 40.

Then, the motor 15 is further actuated to drive the nut 4, with the driving force from the motor 15 being transmitted to the nut 4 through the rotary shaft 18, the driven shaft 19, the nut driving unit 26 and the nut driving pawls 31. Consequently, the nut 4 moves upwardly on the stud bolt 3 while turning around the latter and, as the nut 4 moves upwardly, the driven shaft 19 also moves upwardly relative to the rigid plate 22 by the engagement between the thread 20 formed on the outer periphery of the driven shaft 19 and the shaft retaining nut 21.

Since the thread 20 of the driven shaft 19 has a pitch slightly larger than the thread pitch of the nut 4 (the pitch difference is on the order of several millimeters as a whole), the amount of upward movement of the driven shaft 19 as the result of the turning of the thread 20 is larger by several millimeters than the amount of the upward movement of the nut 4. Accordingly, the load (on the order of several tens of kilograms) which has been imposed on the stud bolt 3 by the nut 4 is gradually transmitted to the retaining spring 27 through the washer 5, the chuck 32 and the nut driving unit 26. Consequently, it is possible for the nut 4 to be removed without any damage to the threads of the stud bolt 3 and the nut 4 caused by such load.

When the nut 4 has been removed from the stud bolt 3, the nut 4 is carried on the washer 5 which is retained by the chuck 32 (FIG. 5). On the other hand, the driven shaft 19 supporting the chuck 32 and the nut driving unit 26 is screw-mounted on the shaft retaining nut 21. Accordingly, the nut 4 and the washer 5 are now suspended from the lifting arm 11.

The apparatus 14 which retains the nut 4 and the washer 3 through the chuck 32 is transported to a desired position by the movement of the station 10. Thereafter, the motor 15 is reversed and then the nut 4 and the washer 5 are lowered. The air cylinders 24 are actuated to open the chuck 32, and the nut 4 and the washer 5 are released.

It is possible to easily mount the nut 4 on the bolt 3 by reversing the above-described procedure. In this case, the load applied to the nut 4 is absorbed by the retaining spring 27, so that the nut 4 is remounted on to the stud bolt 3 without any damage to the threads of the nut 4 and the stud bolt 3.

The apparatus of the invention has been described above with respect to the removal operation of the nut 4 together with the associated washer 5. However, it is sometimes required to remove only nut 4 from the flange 1a of the closure head 1. In such a case, the nut 4 is retained by the chuck 32 through engagement between the lifting pawls 35 and a bottom of the nut 4 or an annular groove formed on an outer peripheral surface of the nut 4. The longitudinal length of the chuck 32 is set such that it is possible for the lifting pawls 35 to properly retain the nut 4.

Figure 12A:
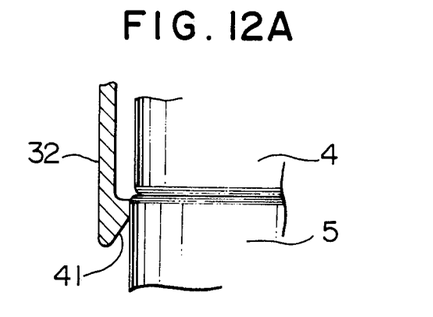
FIGS. 12A to 12C are partially schematic cross sectional views of a portion D in FIG. 8 illustrating an operation of a chuck in the case where it retains a nut alone at the bottom portion thereof.
Figure 12B:
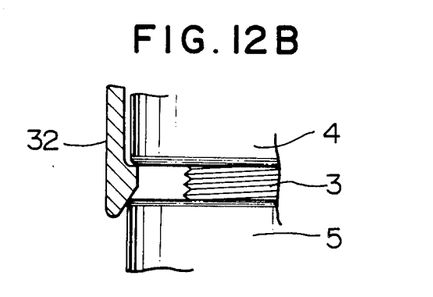
Figure 12C:
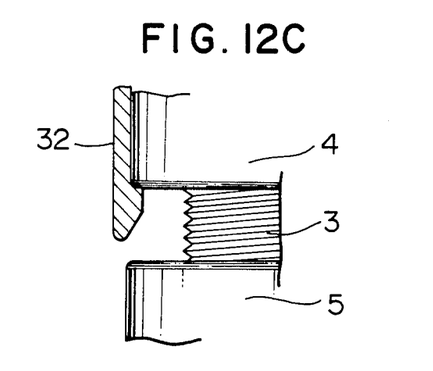

The following is a description of the operation of the apparatus 14 of the invention with respect to the case where the chuck 32 retains the nut 4 at the bottom thereof with reference to FIGS. 12A to 12C.

As shown in FIGS. 12A to 12C, the lifting pawls 35 of the chuck 32 are pressed at distal ends thereof against the washer 5 by the force of the springs 33 provided above the lifting pawls 35 (FIG. 12A). When the nut 4 is driven under this state, the nut 4 is separated from the washer 5, and part of the lifting pawls 35 enters a gap between the nut 4 and the washer 5 (FIG. 12B). When the nut 4 has been sufficiently raised, the nut 4 is now supported by the chuck 32 at its bottom portion (FIG. 12C).

Figure 13:
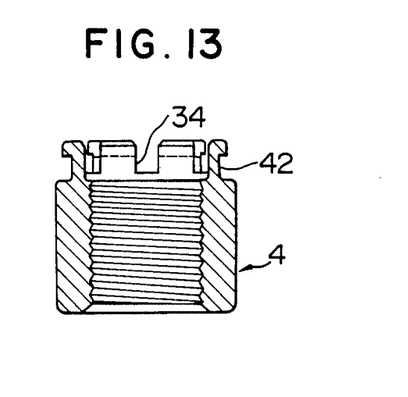
FIG. 13 is a sectional view of a nut which is employed in the case where the nut alone is transferred.

In the case where the nut 4 is retained through the groove provided on the outer periphery thereof, a nut such as that shown in FIG. 13 is employed. Although the nut 4 shown in FIG. 13 is provided at an upper portion thereof with an annular groove 42 from the viewpoint of strength of the nut 4, the groove 42 may be provided at any other positions if there is no problem in terms of the strength.

The chuck 32, employed to retain only nut 4 as described above, has a slanting surface 41 provided at its endmost portion. Thus, the chuck 32 is opened or closed while the slanting surface 41 is in slide contact with the washer 5 at the time of starting the upward movement of the nut 4 and at the time of terminating of the downward movement thereof. It is therefore possible for the nut 4 to be smoothly retained and released.

As has been described above, it is advantageously possible according to the present invention to handle the fastener means such as, for example, nuts, employed on the reactor pressure vessel under a remote control as well as to transport a nut which has been removed to a desired position or a nut to be remounted to a predetermined position.

What is claimed is:

1. An apparatus for removing and remounting, by remote control, large nuts associated with bolts provided on a pressure vessel body to tightly mount a closure head onto said pressure vessel body, said apparatus being capable of transporting said large nuts from predetermined positions on said pressure vessel assembly to desired positions and transferring said large nuts inversely, said apparatus comprising:

a station means for enabling a servicing of said nuts and bolts, said station means being movable in circumferential and radial directions;

a support frame means;

lifting means for vertically displacing the support frame means to and from said station means;

a motor means mounted on said support frame means;

a nut driving means provided with pawls, each of said pawls being engageable with a radial groove formed on an end surface of said large nut, said nut driving means being provided at a distal end portion thereof with a nut retaining means; and a transmission means for transmitting a driving force from said motor to said nut driving means to remove and remount said large nuts through said pawls, said transmission means includes:

a splined rotary shaft secured to an output shaft of said motor means;

a rigid plate secured to and spaced axially from said support frame means by at least a distance corresponding to an axial movement of said large nut to be removed or remounted;

an axially movable shaft spline-engaged with said splined shaft, said axially movable shaft being provided at one end portion of an outer periphery thereof with a thread an axial length of which corresponds to at least said axial movement of said large nut, and being provided at the other end portion thereof with means for supporting said nut driving means without any relative rotation between said movable shaft and said nut driving means; and a retaining nut secured onto said rigid plate and being threadably engaged with said thread of said movable shaft.

2. An apparatus according to claim 1, wherein said means for supporting includes a spline structure therein, and wherein said nut driving means is provided therein with a spline structure which is engaged with said spline structure in said means for supporting without any relative rotation therebetween, and said nut driving means is suspended by said means for supporting through a spring means disposed therebetween.

3. An apparatus according to claim 1, wherein said nut retaining means includes:

supporting members associated with said nut driving means;

pivot pins provided in said supporting means; and chuck elements pivotally mounted on said pivot pins, to one ends of which an actuating force from air cylinders mounted on an air cylinder retainer means which is carried by said nut driving means through bearing means disposed therebetween is applied, whereby the other end portions of said chuck elements are moved close to and apart from each other.

4. An apparatus according to claim 1, wherein said nut driving means is further provided with guide elements disposed circumferentially, said guide elements engaged with a periphery of said large nut when said pawls are received by radial grooves formed on an end surface of said large nut.

5. An apparatus according to claim 2, wherein said retaining nut has a thread, a pitch of which is larger than that of said large nut.

* * * * *